Oct. 8, 1940.   C. C. CASTILLO   2,216,906
MOTOR DRIVE
Filed Sept. 13, 1939
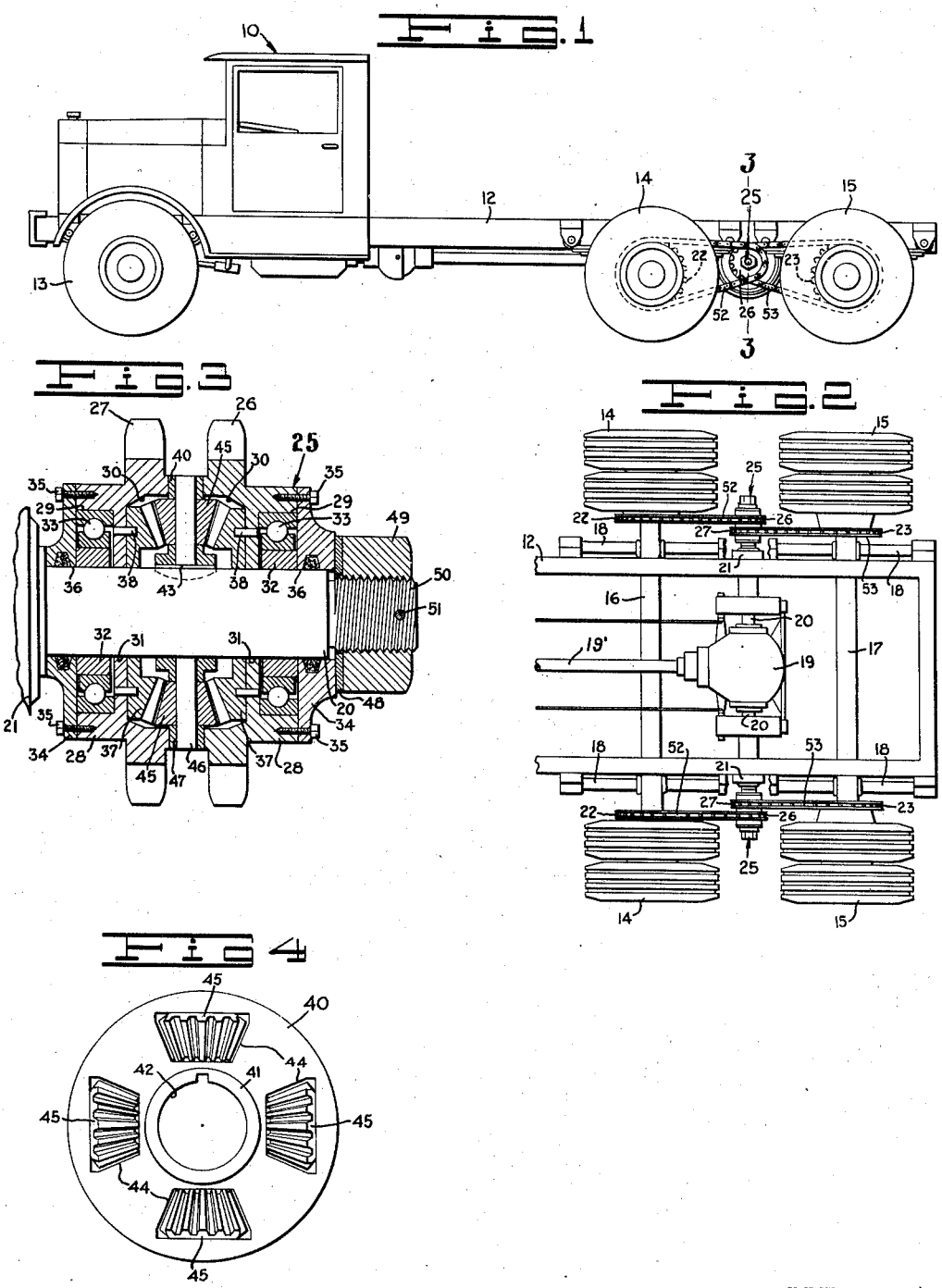
INVENTOR.
C. C. CASTILLO
BY
ATTORNEY.

Patented Oct. 8, 1940

2,216,906

UNITED STATES PATENT OFFICE 2,216,906

MOTOR DRIVE

Cirilo C. Castillo, Los Angeles, Calif.

Application September 13, 1939, Serial No. 294,704

3 Claims. (Cl. 74—311)

This invention relates to improvements in drives for vehicles.

The general object of the invention is to provide improved drive means for a vehicle having tandem drive wheels.

Another object of the invention is to provide a differential drive means for the drive sprockets of a vehicle having tandem chain driven wheels.

Other objects and the advantages of this invention will be apparent from the following description taken in connection with the accompanying drawing wherein:

Fig. 1 is a side elevation of a motor truck embodying the features of my invention;

Fig. 2 is a fragmentary top plan view of the truck shown in Fig. 1;

Fig. 3 is a fragmentary enlarged section through one of the differential mechanisms taken on line 3—3, Fig. 1; and Fig. 4 is a face view of the drive plate and pinions of my differential mechanism.

Referring to the drawing by reference characters I have shown my invention as embodied in a motor driven truck generally at 10. As shown the truck 10 includes the usual chassis frame 12 which is mounted on steerable front wheels 13 and two sets of dual drive wheels 14 and 15 on each side at the rear.

The drive wheels 14 and 15 are mounted to rotate on axles 16 and 17 in the usual manner and the axles are shown as connected to the frame 12 in the usual manner by means of leaf springs 18.

Intermediate the axles 16 and 17 the truck includes the usual differential mechanism encased in a housing 19 and driven by a shaft 19'. From the differential jack shafts 20 extend and are supported in the bearings 21 secured to the frame 12.

The forward inner wheel mountings each includes a sprocket 22 and the rear inner wheel mountings each includes a sprocket 23.

Each of the jack shafts 20 extends outward beyond the frame 12 and on each of these extensions I provide a drive sprocket differential mechanism which is indicated generally at 25 and shown in detail in Fig. 3.

As shown each of the differential mechanisms 25 includes sprockets 26 and 27 each of which includes a reduced hub portion 28. Each hub 28 has a recess 29 therein and the body of the gear opposite the hub has a recess 30 therein and a reduced central aperture 31 opening into the recesses 29 and 30.

Each jack shaft 20 is positioned in an aperture 31 and within the recesses 29 has a collar 32 secured thereon. On the collar 32 within the recesses 29 I provided antifriction bearing members 33. The recesses 29 are closed by cap members 34 which are secured to the hubs 28 by screws 35 and are bored as at 36 to receive the jack shaft 20.

Positioned in each of the recesses 30 I provide a bevelled ring gear 37 the body of which is secured against rotation relative to the body of its associated sprocket by dowels 38.

Intermediate the sprockets 26 and 27 I provide an annular drive plate 40 which includes a central hub portion 41 bored as at 42 to receive the jack shaft 20. The drive plate 40 is shown as secured to the jack shaft 20 by a key 43 but any desired manner of connecting it to the jack shaft for rotation therewith may be used.

The drive plate 40 has four equally spaced apertures 44 therein intermediate the periphery thereof and the hub 41. Positioned in each of the apertures 44 I provide a bevelled drive pinion 45 the teeth of which mesh with the teeth of the ring gears 37. The pinions 45 are each rotatably mounted on spindles 46 which are positioned in aligned apertures 47 in the drive plate 40. The inner cap 34 of the device 25 abuts a portion of the jack shaft bearing 21 and the device 25 is retained on the jack shaft by a washer 48 and a nut 49 which engages a reduced threaded portion 50 of the jack shaft and is secured thereto by a pin 51.

The drive sprocket 26 of the devices 25 are connected to the forward wheel sprockets 22 by sprocket chains 52 and the drive sprockets 27 are connected to the rear wheel sprockets 23 by sprocket chains 53.

When the truck 10 is under way the jack shafts 20 rotate and each rotates the drive plate 40 which through the pinions 45 and the ring gears 37 rotates the sprockets 26 and 27.

When the front and rear sets of wheels 14 and 15 on one side travel on a smooth surface, and the tires are of the same size, the sprockets 26 and 27 rotate in unison, but if either of the sets of wheels 14 and 15 go over an abrupt obstruction or depression or the diameters of the tires vary the drive pinions rotate and allow a differential in the speed of the sprockets 26 and 27.

From the foregoing description it will be apparent that I have provided a novel differential drive means for a vehicle which is simple in construction and highly efficient in use.

Having thus described my invention, I claim:

1. In a differential mechanism, a shaft, an annular drive plate secured to said shaft, a plurality of bevel gear drive pinions rotatably mounted on said drive plate, the axes of said pinions being radial to said shaft, a sprocket arranged on each side of the drive plate, the inner faces of said sprockets engaging the said plate, the said sprockets including opposed recesses receiving said bevel gear drive pinions, a bevel ring gear in each of said sprocket recesses, releasable means for connecting the bevel ring gears to said sprockets, said ring gears meshing with said pinions, antifriction bearings for said sprockets, and cap members surrounding said shaft and engaging said sprockets.

2. In a differential mechanism, a bearing, a shaft, journaled in said bearing, an annular drive plate secured to said shaft, a plurality of bevel gear drive pinions rotatably mounted on said drive plate, the axes of said pinions being radial to said shaft, a sprocket arranged on each side of the drive plate, said sprockets engaging the side of said plate adjacent to the periphery of said plate, each of said sprockets including a recessed hub portion into which said bevel gear drive pinions extend, a bevel ring gear in each of said sprocket recesses, means to releasably connect said bevel ring gears to said sprockets, said ring gears meshing with said pinions, antifriction members supported on said shaft and engaging said sprockets, and a cap member secured to each of said sprockets.

3. In a differential mechanism, a bearing, a shaft journaled in said bearing, an annular drive plate secured to said shaft, a plurality of bevel gear drive pinions rotatably mounted on said drive plate, the axes of said pinions being radial to said shaft, a sprocket arranged on each side of the drive plate, said sprockets engaging the sides of said plate adjacent to the periphery of said plate, each of said sprockets including a recessed hub portion into which said bevel gear drive pinions extend, a bevel ring gear in each of said sprocket recesses and secured to said sprockets, said ring gears meshing with said pinions, antifriction members supported on said shaft and engaging said sprockets, cap members surrounding said shaft and engaging said sprockets, one end of said shaft being threaded, a nut on said threaded portion, said caps engaging said bearings and said nut.

C. C. CASTILLO.